United States Patent [19]

Miller

[11] 4,409,012
[45] Oct. 11, 1983

[54] METHOD AND APPARATUS FOR MONITORING A GLASS FURNACE

[75] Inventor: John W. V. Miller, Toledo, Ohio

[73] Assignee: Owens-Illinois, Inc., Toledo, Ohio

[21] Appl. No.: 349,133

[22] Filed: Feb. 16, 1982

[51] Int. Cl.³ .............................................. C03B 1/00
[52] U.S. Cl. ......................................... 65/29; 65/134; 65/158; 65/160; 65/DIG. 13; 356/426; 356/446; 356/447
[58] Field of Search .......... 65/29, 158, 160, DIG. 13, 65/134; 356/426, 446, 447

[56] References Cited

U.S. PATENT DOCUMENTS

| | | | |
|---|---|---|---|
| 2,803,161 | 8/1957 | Summerhayes, Jr. | 356/426 |
| 3,600,149 | 8/1971 | Chen et al. | 65/29 X |
| 3,779,649 | 12/1973 | Bertoya et al. | 356/430 |
| 3,966,332 | 6/1976 | Knapp et al. | 356/427 |
| 4,253,766 | 3/1981 | Funk | 356/446 X |
| 4,260,262 | 4/1981 | Webster | 356/446 X |

Primary Examiner—Arthur D. Kellogg
Attorney, Agent, or Firm—Gerald T. Welch; Myron E. Click

[57] ABSTRACT

A method and apparatus for automatically monitoring the amount of batch material floating on an irradiant pool of melt in a glass melting furnace is disclosed. A video camera is positioned so as to view the surface of the batch and melt mixture through a window formed in a wall of the furnace tank. The video signal is digitized by a computer into a plurality of pixel signals. The pixel signals can be utilized to generate a histogram relating the number of digitized pixel signals to a relative light intensity scale. The generated histogram will be bimodal, with one peak centering around a lower scale value corresponding to the darker batch pixels and the other peak centering around a higher scale value corresponding to the lighter melt pixels. A suitable threshold, such as the minimum point between the two peaks, can be selected to separate the two peaks. The areas defined by the histogram above and below the selected threshold can be determined to provide a reasonable estimate of the amount of batch and melt present in the viewed region of the tank.

25 Claims, 6 Drawing Figures

METHOD AND APPARATUS FOR MONITORING A GLASS FURNACE

BACKGROUND OF THE INVENTION

1. Field of the Invention

The present invention relates in general to glass furnace monitoring methods and in particular to a method and apparatus for monitoring a glass furnace.

2. Description of the Prior Art

In a conventional glass furnace, a mixed batch of solid raw materials is fed into a furnace tank, wherein the temperature of the solid batch is raised to a point where it liquifies and forms into a viscous mass of molten glass. The molten glass is usually referred to simply as melt. In older fuel-fired furnaces, the temperature of the batch is raised by burning gas or oil over the glass, causing heat to be radiated into the batch. In newer electric boost furnaces, heat is generated within the pool of melt itself by passing an electric current therethrough in combination with the above-described gas jets. In either type of furnace, the solid pieces of batch float on the melt until they absorb sufficient heat to liquify.

Both electric boost and fuel-fired type furnaces can be continuous units. In a continuous furnace, the mixed batch of raw materials is fed into one end of the furnace as is required to maintain a desired level of melt within the tank. At the other end of the furnace, the melt flows through a throat formed in the bottom of the tank into a refiner. The refiner distributes the melt to the forehearths of one or more glassware forming machines. Between the doghouse and the throat, a plurality of bubblers can be formed in the bottom of the furnace tank. The bubblers introduce air bubbles within the melt which slowly rise to the surface thereof. The bubbles gently agitate the melt to ensure a thorough mixing of the raw batch materials and to provide a more constant temperature distribution therein.

In any automated glassware forming process, it is critical that the melt supplied to the glassware forming machine remain at a constant temperature. If, however, pieces of relatively cool batch material travel the length of the furnace tank toward the region near the throat before being liquified, significant problems may develop with the melt withdrawn from the furnace because of temperature fluctuations. Hence, it is desirable to monitor the amount and location of the batch present on the surface of the melt within the various regions of the furnace tank to ensure that the furnace and bubblers are operating properly.

Such monitoring is presently accomplished by positioning a video camera near a window formed in the throat end of the furnace tank such that the surface of the melt can be viewed therethrough. An operator watches a cathode ray tube display of the interior of the furnace to locate and estimate the amount of batch floating on the surface of the pool of melt. Such a method is very subjective, with estimates varying greatly from operator to operator. Furthermore, it is highly inefficient to require a furnace operator to constant watch the video display of the surface of the batch and melt mixture within the tank.

U.S. Pat. No. 3,020,033 to McCreanor et al. discloses an inspection and control system for detecting defects on the surface of a body. A photosensitive device such as a video camera is utilized to scan the image of a surface of a moving irradiant body along a fixed line, which line extends substantially perpendicular to the direction of movement of the body. The electron beam of the photosensitive device produces a video signal wherein a relatively long pulse is generated for each scan of the electron beam. Superimposed on the long pulse are positive or negative short pulses which arise when the electron beam scans over a defect, the width of each pulse being proportional to the width of the defect it represents. The defect pulses trigger an oscillator which feeds a high frequency oscillatory signal to a counter only during the successive durations of the short defect pulses. The counter produces an output voltage when the total number of oscillations exceeds a given amount, indicating that the total area of the detected defects exceeds a predetermined limit.

U.S. Pat. No. 2,803,161 to Summerhayes, Jr. discloses a surface roughness measuring method and device. Light from a light source is reflected from the surface of a rotating piece of material into a photosensitive device. The photosensitive device generates an alternating current electrical signal having variations which correspond to the varying intensity light reflected from the area of the material surface being inspected. A spectrum analysis of the alternating current signal can be performed to produce a frequency distribution curve relating the amplitude of the alternating current signal to the frequency components therein. Other electro-optical inspection systems are disclosed in U.S. Pat. Nos. 3,779,649 to Bertoya et al. and 3,966,332 to Knapp et al.

SUMMARY OF THE INVENTION

The present invention relates to a method of automatically monitoring the amount of batch material floating on an irradiant pool of melt in a glass furnace. A video camera is positioned so as to view the surface of the batch and melt mixture through a window formed in a wall of the furnace tank. The entire surface of the mixture, or a particular region thereof, can be scanned by the camera.

The analog video signal is digitized by a computer into a plurality of pixels representing adjacent positions on the surface of the mixture. The pixels can be utilized to generate a histogram of the viewed batch and melt region. The histogram can be displayed on a graph relating an incremented optical gray scale level to the number of pixels corresponding to each step of the gray scale. The generated histogram will be bimodal, with one peak centering around a lower gray scale value corresponding to the darker batch pixels and the other peak centering around a higher gray scale value corresponding to the lighter melt pixels. A suitable threshold is selected on the histogram to separate the two peaks. This threshold can be selected as the minimum point between the two peaks. By mathematical integration, the areas defined by the histograms above and below the selected threshold can be determined to provide a reasonable estimate of the amounts of batch and melt present in the viewed region of the tank.

It is an object of the present invention to provide a method to monitor the location and estimate the amount of batch floating on a pool of melt in a glass furnace.

It is another object of the present invention to provide a method to more efficiently monitor the operation of a glass furnace and the bubblers therein.

It is a further object of the present invention to provide a method to increase the operating efficiency of a glass furnace by automating the monitoring process.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
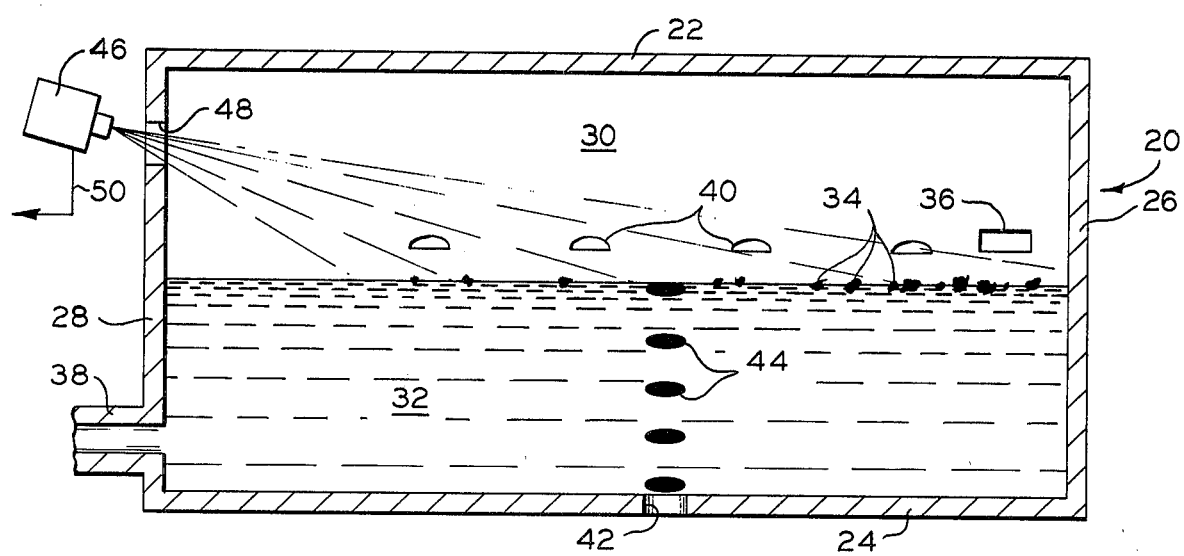
FIG. 1 is a schematic sectional elevational view of a heating tank of a glass furnace and a monitoring camera.

Referring now to the drawings, there is illustrated in FIG. 1 a schematic sectional elevational view of a heating tank 20 of a glass furnace. The tank 20 includes a roof or crown 22, a bottom 24, an end wall 26, a throat end wall 28, and a pair of opposing side walls 30 (only one is illustrated). A viscous pool of melt 32 is contained within the tank 20. A plurality of solid pieces of batch 34 are fed into the tank 20 through a pair of apertures 36 formed in the sidewalls 30 near the end wall 26. The solid pieces of batch 34 float on the surface of the pool of melt 32 until they have absorbed sufficient heat so as to liquify into the melt 32. A throat 38 is formed in the throat end wall 28 near the bottom 24 to remove melt 32 from the tank 20.

A plurality of gas jets 40 (FIGS. 2 and 3) are formed in the end wall 26 and in the side walls 30 to burn gas so as to raise the temperature within the tank 20. Heat from the burning gas is reflected off the crown 22 and side walls 30 into the pieces of batch 34 and the pool of melt 32. It will be appreciated that any means for heating the batch pieces 34 can be utilized.

The pieces of batch 34 are fed through the apertures 36 into the tank 20 at a rate proportional to the rate at which melt 32 is removed from the tank 20 through the throat 38 such that the incoming volume equals the outgoing volume. Thus, the level of the melt 32 in the tank 20 remains generally constant. The batch pieces 34 which are fed into the tank 20 tend to migrate slowly away from the end wall 26 and towards the throat end wall 28. About midway down the length of the tank 20, a plurality of apertures 42 (only one is illustrated) are formed in the bottom 24. Each aperture 42 is connected to a bubbler unit (not shown). A bubbler is a conventional device which introduces a plurality of air bubbles 44 into the pool of melt 32. The bubbles 44 rise slowly through the viscous melt 32 slowly agitating the melt 32 to ensure a thorough mixing of the raw materials contained in the batch pieces 34 and to provide a more constant distribution therein.

Figures 2, 3:
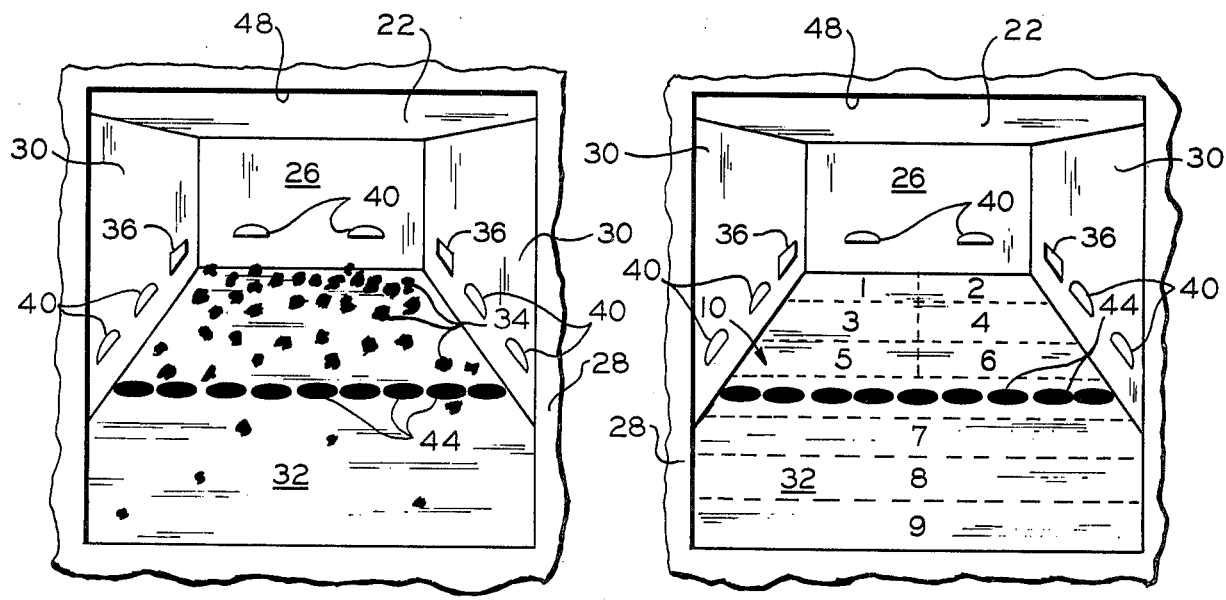
FIG. 2 is a perspective view of the surface of the batch and melt mixture in the furnace tank as viewed by the camera of FIG. 1.
FIG. 3 is a perspective view, similar to FIG. 2 but with the batch pieces removed for clarity, illustrating a typical division of the surface of the batch and melt mixture into a plurality of regions.

As previously mentioned, it is important that all of the pieces of batch 34 liquify into the melt 32 before they reach the throat end wall 28 of the tank 20. Preferably, most of the batch pieces 34 will liquify into the melt 32 before they reach the region of the bubblers. Hence, it is desirable to monitor the amount of solid batch 34 present in different regions of the pool of melt 32. To accomplish this, a conventional video camera 46 is positioned in a windowed aperture 48 formed in the throat end wall 28 near the crown 22 to view the interior of the tank 20 and the surface of the pool of melt 32. The camera 48 functions as a means for generating electrical signals representative of the light reflected from and emitted by the region of the surface of the mixture. The camera 48 can be a conventional video camera, such as a K-17 video camera manufactured by Siemens Corporation of Cherry Hill, N.J. FIG. 2 illustrates a typical perspective view of the interior of the tank 20 as seen by the camera 46. The analog video signal generated by the camera 46 is fed over a line 50 to an apparatus for determining the relative amounts of batch 34 and melt 32 present in a selected region of the surface of the mixture.

The pool of melt 32 within the tank 20 is maintained at such a high temperature that energy in the form of light is radiated therefrom. The pieces of batch 34 which float on the surface of the melt 32 are much cooler and do not radiate as much light. Hence, the batch pieces 34 appear to the camera 46 as dark bodies against the bright pool of melt 32. Similarly, the air bubbles 44 which have been introduced into the melt 32 by the bubblers are much cooler than the melt 32 itself. Thus, those portions of the melt 32 which immediately surround the bubbles 44 will also appear to the camera 46 as dark spots against the bright background of the hot melt 32.

The optical characteristics of the bright pool of melt 32 and the dark pieces of batch 34 and air bubbles 44 provide a simple and accurate basis for monitoring the operation of the glass furnace and estimating the amount and location of the batch pieces 34 in the pool of melt 32. By comparing the area of the dark portions caused by the cool batch pieces 34 to the area of the bright portions caused by the hot melt 32 within a particular region, the relative amounts of batch 34 and melt 32 in that region can be consistently determined.

The relative concentration of the batch pieces 34 near the end wall 26 will be greater than the relative concentration of the batch pieces 34 near the throat end wall 28 because the batch pieces 24 will gradually liquify into the melt 32 as they migrate down the length of the tank 20. Thus, different regions of the surface of the pool of melt 32 can be viewed for different expected amounts of batch 34. FIG. 3 illustrates a sample division of the surface of the melt 32 into ten regions. The batch pieces 34 have been omitted in FIG. 3 for clarity. Regions 1 through 6 comprise the doghouse end portion of the pool of melt 32, wherein a large concentration of dark batch pieces 34 would be expected to be present. Regions 7 through 9 comprise the throat end portion of the pool of melt 32, wherein a much smaller concentration of dark batch pieces 34 would be expected to be present if the furnace were operating properly. Region 10 comprises the region of the bubblers, wherein a predetermined amount of dark bubbles 44 would be expected to be present if all of the bubblers were operating properly.

Figure 4:
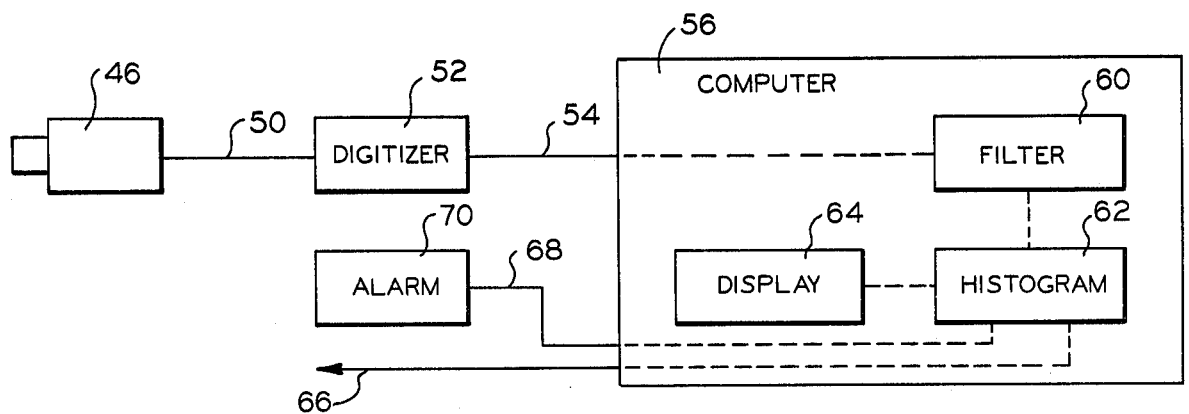
FIG. 4 is a block diagram of an apparatus for determining the relative amounts of batch and melt in a region of the surface of the mixture of FIG. 3.

Referring now to FIG. 4, there is shown the camera 46 which generates the video signal on the line 50 to a digitizer 52. The digitizer 52 converts the analog signal into a plurality of digital pixel signals which are generated on a line 54 to a computer 56. The digitizing of the video signal can be performed by a Frame Grabber digitizer manufactured by Matrox of Quebec, Canada. The computer can be any conventional unit, such as LSI-11/23 computer manufactured by Digital Electronics Corporation of Maynard, Mass. To monitor the general location of the batch pieces 34 in the melt, the computer can select that portion of the video signal representing one or more of the above-described regions 1 through 10 which it is desired to monitor.

The pixel signals can be filtered in a filter section 60 which can be a portion of the computer program. The filtering reduces low frequency illumination variations within a scanned region caused by variances in furnace heat distribution, non-linearities in the response of the camera 46, and other optical irregularities not related to the amounts of melt 32 and batch 34. Each scanned region is locally corrected by the filter 60 to eliminate differences in light intensity caused by these irregularities. The effect of this filtering is to remove the low frequency components of the pixel signals, thereby referencing each pixel to a standard mean value.

The filtering can be accomplished by applying statistical differencing algorithmic techniques to the pixel signals, as described in greater detail in Chapter 12 of the book *Digital Image Processing* by William K. Pratt, published in 1978 by John Wiley & Sons, Inc. Such filtering can also be accomplished by a homomorphic filter, wherein the pixel signal data is initially applied to a logarithmic transform. The higher frequencies of the transformed data are then emphasized by the use of a linear high pass filter. Finally, the emphasized transform signal is exponentially transformed back to the linear domain. The homomorphic filter is generally described in Chapter 15 of the *Digital Image Processing* book. The filtered pixel signals can be utilized by the computer 56 to generate a histogram relating the relative concentrations of the batch 34 and melt 32 in the scanned region of interest in a histogram section 62.

Once the computer 56 has determined the histogram information, the histogram and any related data can be visually presented on a display 64 such as a cathode ray tube. The information can also be made available as output signals on an output line 66. The computer 56 also can compare the relative amounts of batch and melt with stored values representing acceptable operating limits to generate an alarm signal on a line 68 to a visual and/or audio alarm 70 when the furnace has exceeded operating limits. The sections 60 and 62 alternatively can be separate hardware circuits rather than incorporated in the computer 56.

Figure 5:
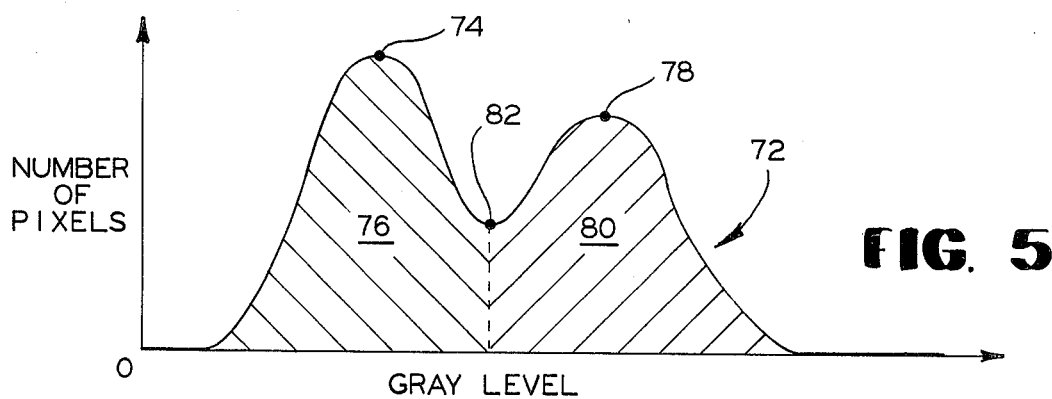
FIG. 5 is a graph of a typical histogram generated from the camera signals from one of the regions of FIG. 3.

Referring now to FIG. 5, there is illustrated a typical filtered histogram 172 of one of the regions in the doghouse end of the tank 20. The histogram 72 is a frequency distribution curve relating the number of digitized pixels to an incremented optical gray level scale. As the value of the gray level increases, the intensity of light changes from very dark to very bright. Thus, each of the pixel signals is compared against the scale to determine the particular intensity of light it possesses. Pixel signals of equal gray level are summed to form the illustrated curve.

The generated histogram 72 will be bimodal, with a first peak 74 defining a first bell-shaped portion 76 centered about a lower gray scale value corresponding to the dark batch pieces 34 and a second peak 78 defining a second bell-shaped portion 80 centered about a higher gray scale value corresponding to the bright melt 32. The areas of the first and second bell-shaped portions 76 and 80 can be determined by mathematical integration of the respective portions of the histogram curve 72 which define them. Once determined, the areas of the first and second bell-shaped portions 76 and 80 can be compared to determine the relative amounts of batch 34 and melt 32 within the monitored region. In the illustrated histogram 72, it can be seen that the amount of batch 34 exceeds the amount of melt 32 since the area of the first bell-shaped portion 76 obviously is larger than the area of the second bell-shaped portion 80.

Since the two bell-shaped portions 76 and 80 overlap somewhat between the two peaks 74 and 78, it is first necessary to select a threshold value between the two peaks 74 and 78 so as to separate the first bell-shaped portion 76 of the histogram 72 representing the batch 34 from the second bell-shaped portion 80 of the histogram 72 representing the melt 32. Ideally, the threshold would be selected at a point on the histogram 72 which would result in a minimum error for both bell-shaped portions 76 and 80. Assuming that the bell-shaped portions 76 and 80 represent normal distributions, the ideal threshold would divide the histogram 72 such that the number of pixels representing portions of the batch 34 extending above the threshold into the second bell-shaped portion 80 would exactly equal the number of pixels representing portions of the melt 32 extending below the threshold into the first bell-shaped portion 76.

Rather than determining the ideal threshold as discussed above, a nearly ideal threshold can alternatively be selected at a minimum point 82 between the two peaks 74 and 78 on the histogram 72. The minimum point 82 can be determined by conventional algorithmic techniques. Although the selection of the threshold at this minimum point 82 will only approximate the ideal half-and-half split of batch 34 and melt 32 as described above, such a selection is quite simple to locate on the histogram 72. Therefore, it is much easier to determine the areas of the two bell-shaped portions 76 and 80. It has been found that the regions 3 through 6 illustrated in FIG. 3 most closely approximate the desired half-and-half split of melt 32 and batch 34. Hence, it is preferable that the minimum point be determined from a histogram generated from one of these regions. So long as the threshold is consistently selected at the minimum point 82 on the histogram 72, the relative amounts of batch 34 and melt 32 will be consistently determined. Such consistency provides sufficient accuracy for automated production operation purposes.

Figure 6:
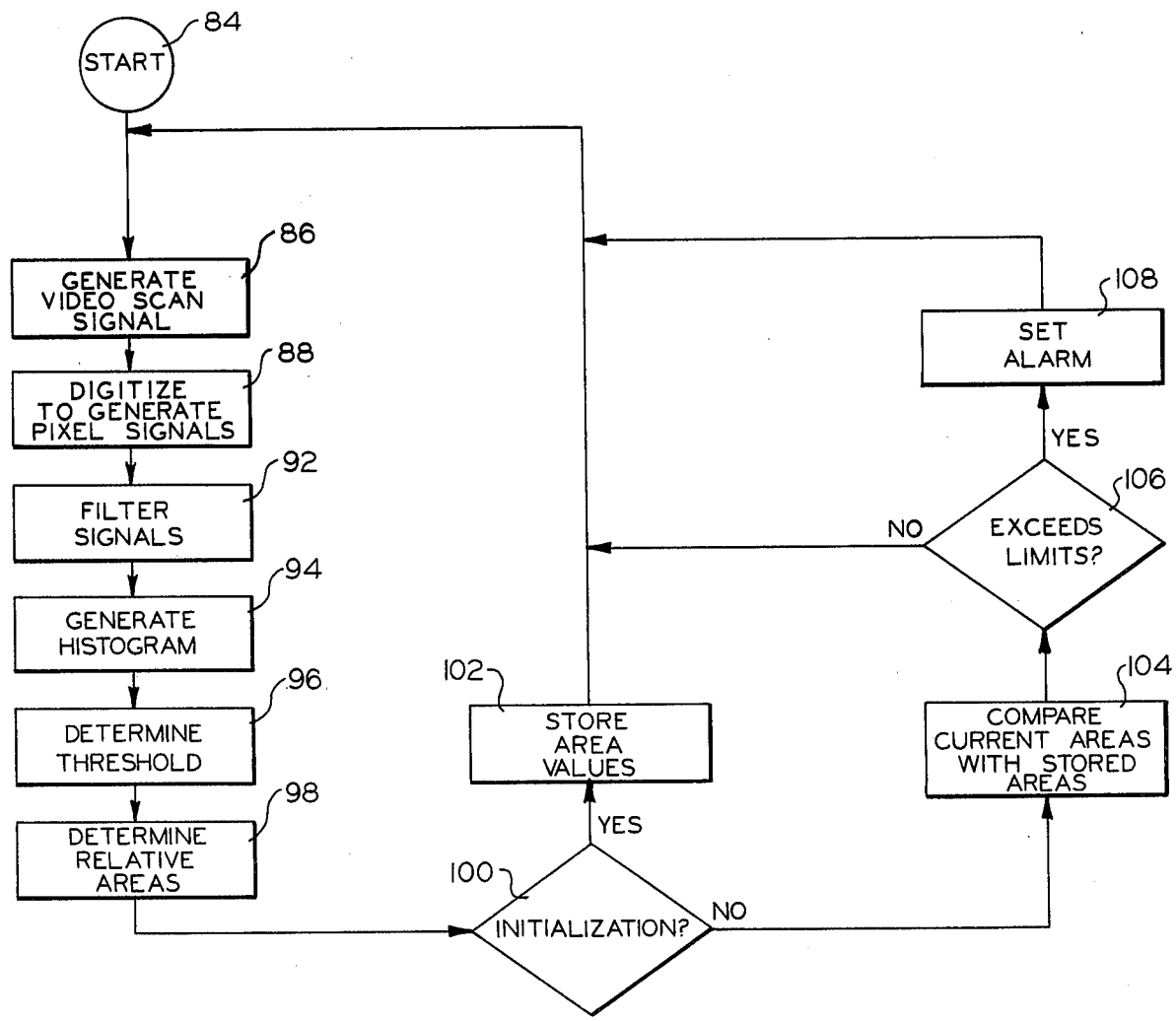
FIG. 6 is a flow diagram of a method of determining the relative amounts of batch and melt in a region of the surface of the mixture of FIG. 3.

In operation, an experienced furnace operator brings the glass furnace to a proper operating condition. Once the furnace has been determined to be operating properly, a histogram 72 can be generated for one or more regions within the tank 20 which the operator desires to monitor. Referring to FIG. 6, there is shown a flow diagram of the method according to the present invention. The process begins at the circle START 84 and enters a GENERATE VIDEO SCAN SIGNAL step 86. Then the process enters a DIGITIZE TO GENERATE PIXEL SIGNALS step 88 and the pixel signals are processed through a FILTER SIGNALS step 92. The next step in the process is to generate a histogram in a GENERATE HISTOGRAM step 94. The histogram will have a peak for the batch and a peak for the melt with a minimum point in between. The process enters a DETERMINE THRESHOLD step 96 to select the minimum point as the threshold value for determining the areas under the two peaks of the histogram. The process enters a DETERMINE RELATIVE AREA step 98 to generate a value for each of the batch area and melt area of the histogram.

The relative amounts of batch 32 and melt 34 in each of the regions can be determined as described above and stored in the computer memory. The program enters a decision step INITIALIZATION? step 100. If the initial values for the furnace are being determined, the process exits at YES to a STORE AREA VALUES step 102 to store the values of the areas for the batch and melt in an initial values area of the computer memory. The process then returns to step 86. The process is repeated for each of the regions in the tank 20. After this initial determination of the proper batch 34 and melt 32 mixtures for the various regions for the tank 20, the computer 56 can be set to subsequently monitor the various regions within the tank 20 automatically. The results obtained from the subsequent computer monitoring can be compared to the initially obtained values stored in the computer which initial values are indicative of a properly operating furnace.

Steps 86 through 98 are repeated for a selected region in the tank 20. Since the initialization has been completed, the process will branch from the INITIALIZATION? determination point 100 at NO and enter a step COMPARE CURRENT AREAS WITH STORED AREAS step 104. The current values of the batch and melt histogram areas are compared with the stored area values to determine if the furnace is operating properly. The stored values can be stored as an upper and a lower limit for each of the batch and melt by either sampling the tank several times during the initilization period or by applying tolerance limits to the initially determined values. The process enters a decision point EXCEEDS LIMITS? step 106. If the current area values are within the limits, the process branches at NO and returns to the step 86. If the limits are exceeded, the process branches at YES and enters a SET ALARM step 108. The computer 56 has determined that the current areas of batch 34 and melt 32 differ by too great an amount from the initial values for the areas of the batch and melt respectively. The computer 56 then generates an alarm signal to the operator indicating that the furnace is malfunctioning. Such malfunctioning can be caused either by an excess amount or an insufficient amount of batch 34 which is represented by too large an area or too small an area respectively of batch 34 with respect of melt 32. After the alarm has been set, the process returns to step 86.

The operation of the bubblers can be similarly monitored. The area of the dark bubbles 44 in region 10 should remain generally constant so long as all of the bubblers are operating properly. However, if one or more of the bubblers fails to introduce the air bubbles 44 into the melt 32, the area of the dark bubbles 44 will decrease. Thus, the alarm signal can also alert the operator to a malfunctioning bubbler. It will be appreciated that the above-described method can be utilized to monitor the surface of any mixture of materials in an enclosure so long as one of the materials to be monitored radiates or reflects light which appears to be of a different intensity or gray level than the other materials to be monitored.

In accordance with the provisions of the patent statutes, the principle and mode of operation of the present invention has been explained and illustrated in their preferred embodiment. However, it must be appreciated that the present invention can be practiced otherwise than as specifically explained and illustrated without departing from its spirit or scope.

What is claimed is:

1. A method of estimating the relative amounts of two materials in a region of the surface of a mixture containing at least the two materials from a digitized video pixel signal representative of the amount of light received from the region of the surface of the mixture, one material being brighter in light intensity than the other material, comprising the steps of:
   (a) selecting the video pixel signals from a predetermined area of the surface of the mixture;
   (b) generating a histogram based on the total number of said selected pixel signals of equal intensity as a function of a relative light intensity scale; and
   (c) determining the areas defined by said generated histogram for each of the materials, the relative amounts of said determined areas being approximately equal to the amounts of the materials in the predetermined area of the surface of the mixture.

2. The method of claim 1 wherein said step of generating said histogram includes the step of filtering said pixel signals to reference each of said pixel signals to a standard mean value.

3. The method of claim 2 wherein said step of filtering includes applying a statistical differencing algorithm to said generated histogram.

4. The method of claim 2 wherein said filtering step includes passing said pixel signals through a homomorphic filter.

5. A method of estimating the relative amounts of two materials in a region of the surface of a mixture containing at least the two materials from a digitized video signal representative of the amount of light received from the region of the surface of the mixture, one material being brighter in light intensity than the other material, comprising the steps of:
   (a) selecting the video pixel signals from a predetermined area of the surface of the mixture;
   (b) generating a histogram based on the total number of said selected pixel signals of equal intensity as a function of a relative light intensity scale;
   (c) selecting a threshold on said generated histogram to separate said pixel signals relating to the brighter material from said pixel signals relating to the darker material; and
   (d) determining the areas defined by said generated histogram for each of the materials, the relative amounts of said determined areas being approximately equal to the amounts of the materials in the predetermined area of the surface of the mixture.

6. The method of claim 5 wherein said threshold selection step includes selecting a point on said generated histogram wherein the number of said pixel signals relating to the brighter material approximately equals the number of said pixel signals relating to the darker material.

7. The method of claim 5 wherein said threshold selection step includes selecting the minimum point on said generated histogram between a first peak of said pixel signals relating to the darker material and a second peak of said pixel signals relating to the lighter material.

8. The method of claim 5 wherein said area determining step includes mathematically integrating said generated histogram on each side of said selected threshold to obtain said determined areas.

9. A method of monitoring the operation of a glass furnace, the glass furnace including a furnace tank for decomposing non-radiant solid batch into irradiant liquid melt, and means for generating a video signal representative of the amount of light in the region of the surface of the batch and melt mixture, comprising the steps of:
   (a) digitizing the video signal into a plurality of pixel signals;
   (b) generating a histogram relating the number of said digitized pixel signals to a relative light intensity scale;
   (c) selecting a threshold on said generated histogram to separate the pixel signals relating to the melt from the pixel signals relating to the batch;
   (d) determining the areas defined by said generated histogram and said selected threshold for the batch and the melt;
   (e) comparing said determined areas with respective predetermined values, the predetermined values being indicative of a properly operating furnace; and
   (f) generating an alarm signal when at least one of said determined areas differs from the predetermined value by a predetermined amount.

10. The method of claim 9 wherein said histogram generating step further includes the step of filtering said pixel signals to reference each of said digitized pixel signals to a standard mean value.

11. The method of claim 10 wherein said histogram filtering step includes applying a statistical differencing algorithm to said generated histogram.

12. The method of claim 10 wherein said histogram filtering step includes passing said pixel signals through a homomorphic filter.

13. The method of claim 9 wherein said threshold selection step includes selecting a point on said generated histogram wherein the number of said digitized pixel signals relating to the melt approximately equals the number of said digitized pixel signals relating to the batch.

14. The method of claim 9 wherein said threshold selection step includes selecting a minimum point on said generated histogram between a first peak of said digitized pixel signals relating to the melt and a second peak of said digitized pixel signals relating to the batch.

15. The method of claim 9 wherein said area determining step includes mathematically integrating said generated histogram on each side of said selected threshold to obtain said determined areas.

16. The method of claim 9 including selecting at least two groups of said pixel signals each group representing a separate predetermined area of the surface of the mixture and performing steps (b) through (f) for each of said groups of said pixel signals.

17. A method of monitoring the operation of a glass furnace, the glass furnace including a furnace tank for decomposing batch material into an irradiant liquid melt, bubbler means in the tank for introducing non-radiant bubbles into the batch and melt mixture, and means for generating a video signal representative of the light from a region of the surface of the melt including the bubbles, comprising the steps of:
   (a) digitizing the video signal into a plurality of pixel signals;
   (b) generating a histogram relating the number of said digitized pixel signals to a relative light intensity scale;
   (c) selecting a threshold value on said histogram to separate said pixel signals relating to the melt from said pixel signals relating to the bubbles;
   (d) determining the amounts of the areas defined by said histogram and said selected threshold value for the bubbles and the melt; and
   (e) comparing said determined area amounts with respective predetermined values, the predetermined values being indicative of a properly operating furnace and bubbler means, to monitor the operation of the glass furnace.

18. The method of claim 17 including the step of generating an alarm signal when at least one of said determined area amounts differs from the associated predetermined value by a predetermined amount.

19. In an enclosure containing a mixture of two materials, one material appearing to be brighter in light intensity than the other darker material, an apparatus for determining the relative amounts of the materials in a region of the surface of the mixture including means for generating a plurality of digital pixel signals representative of light from points in the region of the surface of the mixture, comprising:
   means responsive to the pixel signals for generating output signals representing a histogram based on the total number of the pixel signals of equal intensity as a function of a relative light intensity scale; and
   means responsive to said output signals for determining the amount of area defined by the histogram for each of the materials, the amounts of the areas being proportional to the amounts of the associated materials in the region of the surface of the mixture.

20. An apparatus in accordance with claim 19 wherein the signal generating means includes a video camera.

21. An apparatus in accordance with claim 19 wherein said histogram generating means includes a histogram section in a digital computer.

22. An apparatus in accordance with claim 19 wherein said area determining means includes a digital computer.

23. An apparatus in accordance with claim 19 further including filtering means responsive to the pixel signals for referencing each of the pixel signals to a standard mean value.

24. In a glass furnace including a furnace tank for decomposing non-radiant solid batch into irradiant liquid melt, and a source of a video signal representative of the light from a region of the surface of the batch and melt mixture, an apparatus for monitoring the operation of the glass furnace comprising:
   means responsive to the video signal for digitizing the video signal into a plurality of pixel signals;
   means responsive to said digital pixel signals for generating output signals representing a histogram relating the number of said pixel signals to a relative light intensity scale;
   means for selecting a threshold on the generated histogram to separate the pixel signals relating to the melt from the pixel signals relating to the batch;
   means for comparing the areas defined by the histogram and said selected threshold for the batch and the melt and for comparing said areas with respective predetermined values, the predetermined values being indicative of a properly operating furnace; and means responsive to said comparing means for generating an alarm signal when one of said areas differs from the associated predetermined value by a predetermined amount.

25. In a glass furnace including a furnace tank, means for feeding non-radiant solid batch into the tank, means for heating the batch to a temperature where it decomposes into irradiant liquid melt, bubbler means formed in the tank for introducing non-radiant bubbles into the batch and melt mixture, a source of a video signal representative of the light from a region of the surface of the melt including the bubbles, and means for withdrawing the melt from the tank, a method of monitoring the operation of the glass furnace comprising:

means responsive to the video signal for digitizing the video signal into a plurality of pixel signals;

means responsive to said pixel signals for generating output signals representing a histogram relating the number of said pixel signals to a relative light intensity scale;

means for selecting a threshold value on the histogram to separate the pixel signals relating to the melt from the pixel signals relating to the bubbles;

means for determining the amounts of said areas defined by the histogram and the selected threshold value for the bubbles and the melt and for comparing said areas with respective predetermined values, the predetermined values being indicative of a properly operating furnace; and means responsive to said comparing means for generating an alarm signal when the amount of one of said areas differs from the associated predetermined value by a predetermined amount.

* * * * *